United States Patent [19]

Lamberti

[11] 4,184,336
[45] Jan. 22, 1980

[54] WATER WAVE ENERGY TRANSDUCER
[75] Inventor: John Lamberti, New York, N.Y.
[73] Assignee: Joseph Benedetto, Brooklyn, N.Y.; a part interest
[21] Appl. No.: 903,499
[22] Filed: May 8, 1978
[51] Int. Cl.² .............................................. F03B 13/12
[52] U.S. Cl. .................................................... 60/507
[58] Field of Search ............................... 60/497–507; 417/330–334, 337; 290/42, 53

[56]     References Cited
    U.S. PATENT DOCUMENTS

| | | | |
|---|---|---|---|
| 987,685 | 3/1911 | Atkinson | 60/507 |
| 1,004,332 | 9/1911 | Allen | 60/507 |
| 1,790,058 | 1/1931 | Morse | 60/504 |

*Primary Examiner*—Allen M. Ostrager
*Attorney, Agent, or Firm*—Robert W. Fiddler

[57]     ABSTRACT

A water wave energy transducer for converting the motion of a water wave into a controlled mechanical movement such as rotational motion suitable for actuating an electrical generator. The transducer comprises a float member floatingly moored in a water body having waves and/or tidal movement, such as a seashore. A power gear is rotatably mounted in a swing block on the float with a power shaft extending from the power gear to laterally spaced drive bevel gears mounted for rotation with the power gear. These drive bevel gears are coupled to a transmission on the float comprising one-way drive clutches transmitting rotational energy to the drive shaft of a generator or the like to provide rotational energy on both up and down movement of the float. A rack is pivotally anchored in the water body, extends up through the float and is slideable with respect to the power gear of the swing block, so that movement of the float with respect to the rack will provide rotation of the power gear.

14 Claims, 4 Drawing Figures

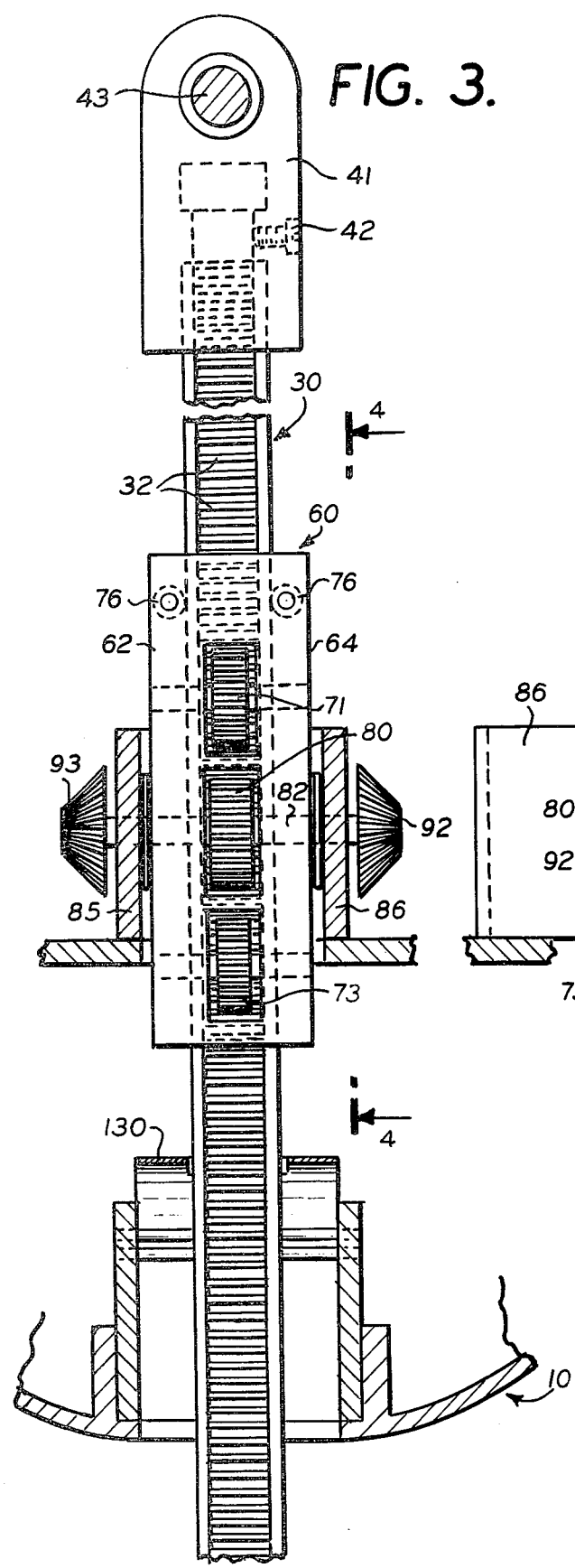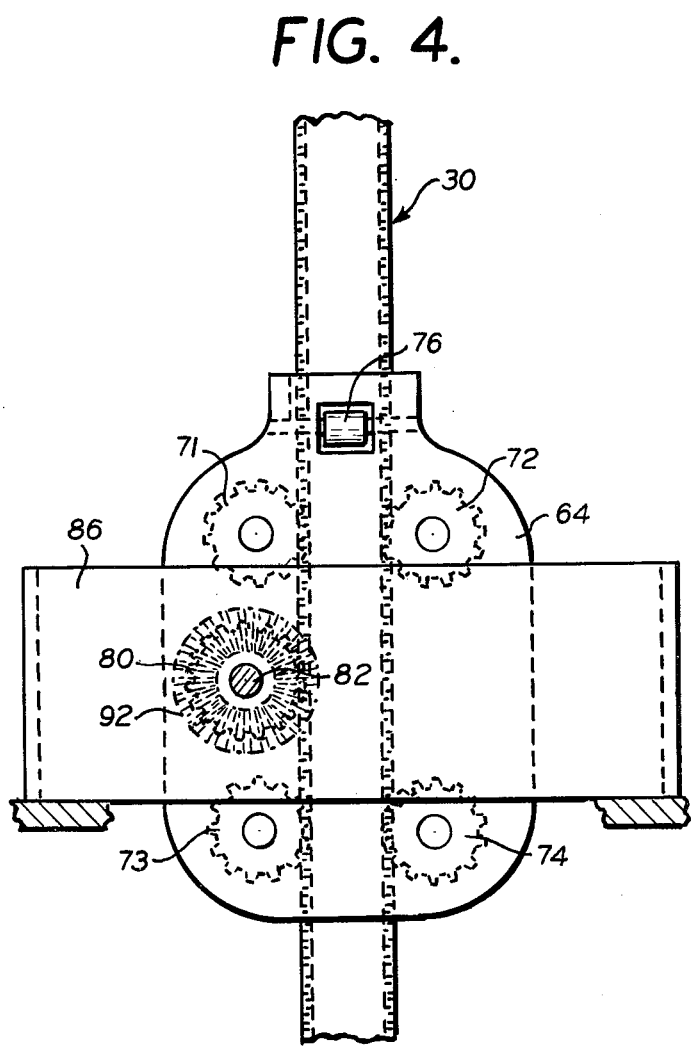

WATER WAVE ENERGY TRANSDUCER

BACKGROUND OF THE INVENTION

This invention relates to water wave energy transducers for converting tidal and wave motions of water bodies such as oceans, seas and relatively large lakes, having such tidal and wave motions, into controlled mechanical movements such as rotational motion suitable for driving a variety of mechanisms, such for example as an electrical generator. A variety of such transducers have in the past been evolved in an attempt to make use of the extensive tidal and wave energies available along all shorelines. Such energy conversion apparatus, such for example as shown in U.S. Pat. No. 3,664,125, generally employ a float arranged on the surface of the water with the float coupled to some mechanism which is driven as a result of the upward and downward motion of the float. These prior art devices are actuated in response to the upward and downward movement of the water surface on which the float rides. They, however, do not accommodate the myriad of other motions of the water, such as inshore and offshore movement of the waves, as well as the currents and cross-currents generally present.

BRIEF DESCRIPTION OF THE INVENTION

It is with the above considerations in mind, that the present improved water wave energy transducer has been evolved serving to convert all of the various movements of a tidal body of water to a controlled mechanical movement, such as rotational energy.

It is accordingly among the primary objects of this invention to provide an improved water wave energy transducer responsive to tidal fluctuations, wave movement, and cross and eddy currents.

Another object of the invention is to provide an improved water wave energy transducer subject to ready installation at relatively low cost along any tidal shoreline.

A further object of the invention is to provide an improved water wave energy transducer requiring minimal maintenance.

These and other objects of the invention which will become hereafter apparent are achieved by forming a float preferably hydro-dynamically contoured to ride freely over a water surface, an elongate boat shaped float being found eminently suitable. The boat shaped float is formed with a lower opening in the nature of a keel board opening through which a rack extends. The lower end of the rack is preferably coupled by a universal joint to a block anchor holding the lower end fixed for rotation, which the upper end is coupled to a relatively flexible cross rod for relatively free movement. A power gear is pivotally mounted for rotation in a swing block on the float with the power gear teeth engaging the rack teeth. The swing block provides idler gears meshing with the rack teeth and serving to prevent the rack teeth from binding with respect to the power gear teeth. The power gear is mounted on a power shaft extending through the swing block and having outboard drive bevel gears, one on each end thereof. The outboard drive bevel gears mesh with transmission input bevel gears fixed to transmission input shafts, one on each side of a transmission frame. The transmission input shaft has arranged thereon, in addition to the transmission input gear, an intermediate clutch coupled transmission gear, which serves to permit transmission of energy from the transmission input gear in only one direction of rotation thereof to an intermediate transmission shaft gear driven by the intermediate clutch coupled transmission gear and in turn driving a transmission output shaft, which is coupled to the generator or like member to be driven by the apparatus.

A feature of the invention resides in the utilization of clutch coupled gears in the transmission such that rotation of the transmission output is only effected in one direction regardless of the wave and tidal motion acting on the float.

Another feature of the invention resides in the arrangement of the float, so as to permit facile orientation in a direction to insure maximum response to the wave motion in the body of water in which positioned.

BRIEF DESCRIPTION OF THE DRAWINGS

The specific details of a preferred embodiment of the invention, and of the manner and process of making and using it will be described in full, clear, concise and exact terms, so as to enable any person skilled in the art to make and use same, in conjunction with the accompanying drawings, wherein:

FIG. 3 is an enlarged cross-sectional elevational view on line 3—3 of FIG. 1, showing the rack and its extent through the float and swing block; and FIG. 4 is a cross-sectional view on line 4—4 of FIG. 3 providing a side elevational view of the swing block.

DESCRIPTION OF PREFERRED EMBODIMENT OF THE INVENTION

Figure 1:
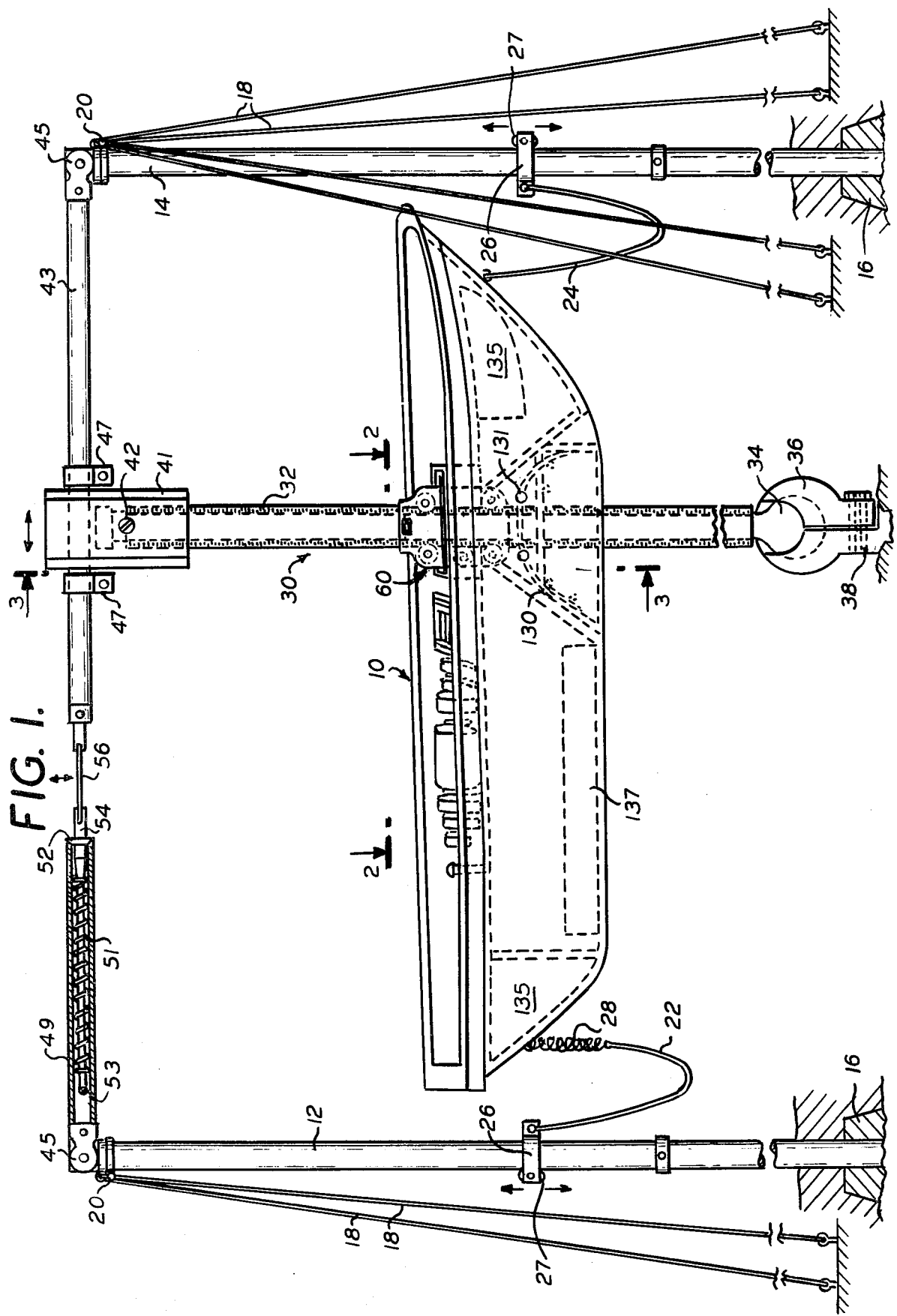
FIG. 1 is an elevational view of a preferred embodiment of the invention.

Referring now more particularly to the drawings, where like numerals in the various FIGS. will be employed to designate like parts, as shown illustratively in FIG. 1, a water wave energy transducer embodying the invention is seen to comprise a float 10, which in the illustrated preferred embodiment is formed of an elongate boat-shaped configuration. The float 10 is mounted between spaced fixedly anchored masts 12 and 14, each having anchor blocks 16 at the lower end thereof securely mooring masts 12 and 14 in a fixed position in the water body in conjunction with which the transducer is to be employed. Guy wires 18 are preferably provided to further insure rigid positioning of the masts 12 and 14, with the guy wires 18 anchored at their lower ends in the water bed, and secured to the masts by means of a collar 20 or the like at the upper end of the masts 12 and 14. Both interior and exterior guy wires 18 are shown holding mast 14. However, it will be understood by those skilled in the art that with tension forces applied externally to mast 12 and to mast 18, there is no need for the internal guy wires illustratively shown at mast 14. Anchoring cables 22 and 24 are provided at opposed ends of the float with one end of each cable fastened to an end of the float 10 and the other end of the cable fastened to a slide collar 26 preferably having slide roller 27 mounted for free sliding on masts 12 and 14, as shown in FIG. 1. A tension release spring 28 is preferably employed at least in one of the anchoring cables, namely, the rear anchoring cable 22 as shown. The length of the cables 22 and 24 is such as to permit free movement of the float 10 in response to available wave and tidal patterns.

A rack bar 30 having rack teeth 32 extends substantially vertically through float 10, as best seen in FIG. 1. The lower end of rack bar 30 is coupled to a ball joint formed by ball 34 fitted into split ball socket 36, held together by means of screw 38, extending through one half of the ball socket into threaded engagement with the other socket half, so as to enable the socket halves to be brought together against the ball joint. The ball socket 36 is anchored fixedly in the bed of the water body in connection with which the transducer is to be employed. It will be noted, however, by those skilled in the art that the ball joint permits swiveling of the rack bar 30 about its longitudinal axis, and about the axis of the ball joint 34.

The upper end of rack bar 30 is engaged in rack end block 41, in which it is held by means of set screw 42. The rack end block 41 is formed with a transverse opening to permit pivoting of the end block 41 on cross rod 43, which is pivotally secured at pivot joint 45 to the top of mast 14. Collars 47 at each side of block 41 limit its lateral shifting with respect to cross rod 43. At the left end of cross rod 43, as viewed in FIG. 1, a hollow tube 49 is provided with a pivot joint 45 like that on the right hand side of rod 43 coupling the cross rod tube 49 to the mast 12 on the left in FIG. 1. Within the tube 49 is a compression spring 51 having a diameter substantially equal to the interior diameter of the tube and held in place in tube 49 by means of tube end 52, which has an opening through which spring piston 54 may reciprocate, with spring piston 54 extending through the spring 51 and provided at its end remote from the tube end 52 with a cotter pin 53, so that movement of the spring piston 54 in tube 49 will be spring resisted when the piston 54 moves to the right. In the illustrated embodiment, connecting rod 56 is pivotally interposed between the cross rod 43, and the spring piston 54, as best seen in FIG. 1.

Figure 2:
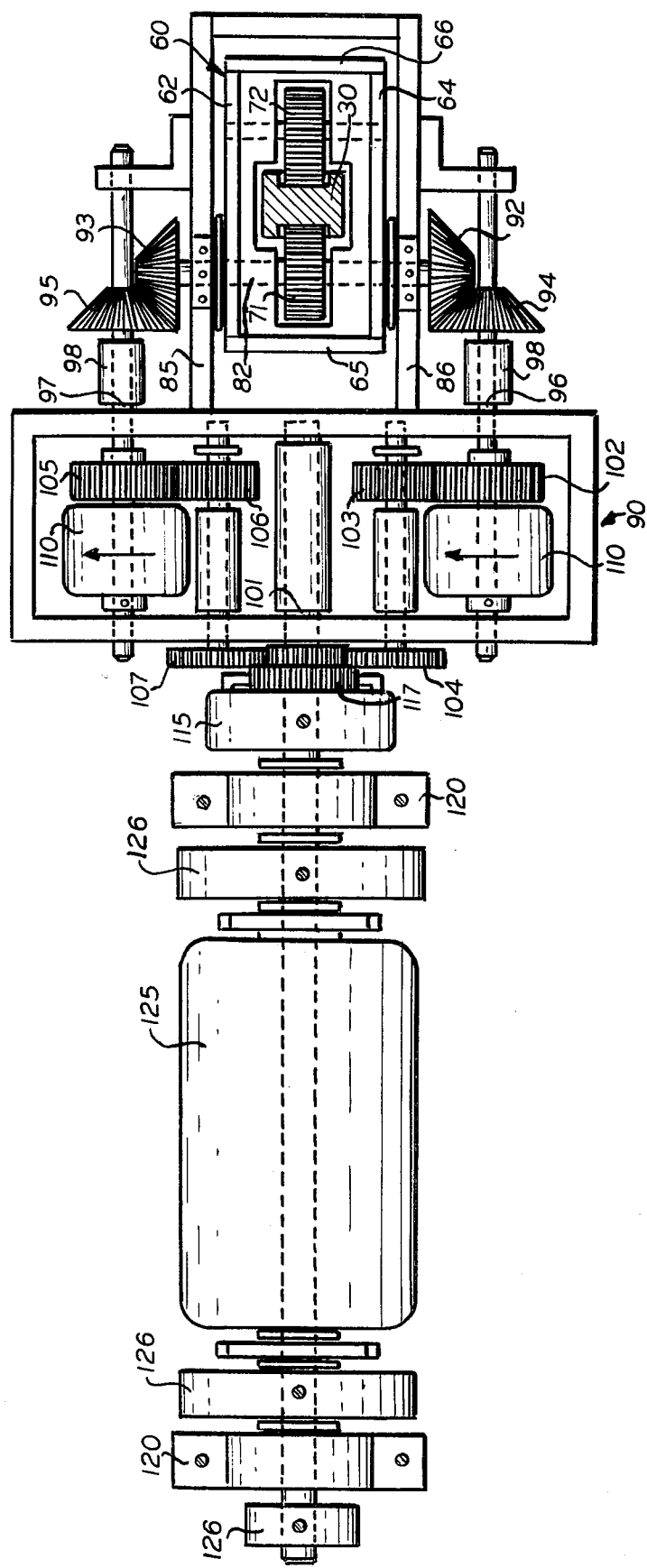
FIG. 2 is an enlarged top plan view looking in the direction of the arrows shown on line 2—2 of FIG. 1 illustrating the generator, transmission and swing block with the rack shown in cross-section.

A swing block 60, as seen in FIGS. 1, 2 and 4, is mounted for sliding on rack bar 30 and movement with float 10. The swing block 60 comprises two spaced gear shaft supporting plates 62 and 64, maintained in their desired spaced orientation by means of spacer bars 65 and 66, as best seen in FIG. 2. As best seen in FIG. 4, four rack guide gears 71, 72, 73 and 74, are supported between the gear shaft supporting plates 62 and 64, with a lateral idler roll 76 arranged in each of swing block plates 62 and 64, as best seen in FIGS. 3 and 4.

Power gear 80, as best seen in FIGS. 3 and 4, is arranged between the rack guide gears in swing block 60, meshing with rack teeth 32, and mounted for rotation on power shaft 82, which extends through and out beyond the swing block gear shaft supporting plates 62 and 64. Power shaft 82 is journalled in extensions 85 and 86 from transmission frame 90 on the float 10, as best seen in FIGS. 2 and 3. Drive bevel gears 92 and 93 are arranged respectively on the opposed outwardly extending ends of power shaft 82, as best seen in FIGS. 2 and 3. These drive bevel gears, mate with transmission input bevel gears 94 and 95 respectively, as best seen in FIG. 2, which are mounted on transmission input shafts 96 and 97 journalled in bearing blocks 98 and extending through transmission frame 90. A transmission output shaft 101, as best seen in FIG. 2, is journalled in transmission frame 90 and is coupled to transmission shafts 96 and 97 by means of transmission gear trains 102, 103, 104, and 105, 106, 107 respectively. Overrunning clutches 110 are coupled to gear train clutches 102 and 105 respectively so as to permit rotation of gears 102 and 105 only in the direction indicated by the arrows on the clutches 110. These clutches are such as are conventionally available from Formsprag of Warren, Mich., in overrunning clutch series FF.

A similar overrunning clutch 115 is coupled to gear 117 on transmission output shaft 101, so as to insure that the output shaft 101 will only rotate in one direction, as understood by those skilled in the art.

In the illustrated embodiment of the invention, the transmission output shaft is illustratively shown as extending through bearing 120 to a generator 125, with appropriate fly wheels 126 arranged on the shaft to provide desired stability of rotation. The transmission frame 90 along with the transmission gearing, the generator 125, and the drive block 60, are mounted preferably at the upper end of float 10, as best viewed in FIGS. 1 and 4. Positioning on the deck of a boat-shaped float in a suitable enclosure is eminently satisfactory. The rack bar 30 is extended down through the float, with the lower portion of the float provided with a shield 130 formed about the keel opening for the rack bar 30. It will be observed that the shield 130 is flexible and upwardly arcuate in configuration to accommodate rotation of the float 10 in a vertical plane about the axis of swing block 60, as the float shifts in response to wave and tidal motions. The shield is preferably formed with rollers 131 engaging the rack bar 30. The compartments of the float will, generally speaking, retain sufficient air to provide desired buoyancy. However, it is preferred that the float be made of some buoyant material having a density less than that of water, or else be formed with buoyancy air compartments or floatation compartment 135, as illustratively shown in the fore and aft portions on FIG. 1. Weight stabilizers 137 may be provided to balance the float 10.

It will further be observed that the desired positioning of the rack bar 30 with respect to the float 10 is that the rack bar be off-center with respect to the float, it being preferred that the rack bar be 20% to 40% of the length of the float closer to one end thereof.

OPERATION

The aforedescribed transducer structure is assembled as described, as will be understood by those skilled in the art, to obtain a structure as illustrated in the drawings. Appropriate woodworking, metalworking or plastic fabricating techniques may be employed to fabricate the components and assemble them in accordance with known methods.

In use, the structure is positioned preferably along the shoreline of a water body having tidal, wave, or current movements of sufficient intensity such as to warrant conversion of the water movements into some desired controlled motion. By way of example, it is contemplated installing the transducer along the seashore having known tidal and wave movements. The lower end of the rack is anchored in the bed of the water body in a desired ball and socket joint; and the upper end of the rack is controlled in its movement to a limited extent, as by means of the cross rod 43. However, it will be noted that though the movement is controlled, the upper end of the rack is relatively free, and upon installation, it is contemplated that the spring constant of spring 51 and the dimensioning of the cross rod will be such as to permit movement of the rack to accommodate a majority of the wave and tidal movements to which the float may be subjected.

The float 10 similarly is limitedly constrained in its movement by means of anchoring cables 22 and 24. However, the dimensioning of the anchoring cables is such as to permit relatively free movement of the boat, so as to provide maximum response to the wave motion which it is desired to transduce.

After installation of the transducer, it will be observed that the movement of the water on which the float rides, whether of a tidal, current, or wave, nature will cause the float to move with respect to the rack bar. As a result of this motion which will be produced between the float 10 and the rack bar 30, and swing block 60, will be caused to move relative to the rack bar, and the power gear 80 will be rotated. Rotation of power gear 80 in a clockwise direction as viewed in FIG. 4 as a result of upward movement of the float 10 with respect to the rack bar 30 will cause drive bevel gears 92 and 93 to rotate. Drive bevel gear 92 when viewed head-on will rotate clockwise, whereas drive bevel gear 93 when viewed head-on will rotate counterclockwise. In order to make certain that the output from the transmission will provide rotational energy in only one direction, overriding clutches 110 are provided in a transmission drive train held in transmission frame 90, so that the transmission output shaft 101 will rotate in only one direction.

It will be apparent to those skilled in the art that both the upward and downward movement of the swing block in the float with respect to the rack will produce rotational energy in one direction.

It is thus seen that a simple and efficient transducer has been provided, serving to take advantage of both directions of movement of waves in water, so as to provide a continuous rotational output of energy which may be suitably employed for driving a generator or the like.

The above disclosure has been given by way of illustration and elucidation, and not by way of limitation, and it is desired to protect all embodiments of the invention within the scope of the appended claims.

What is claimed is:

1. A water wave energy transducer for converting the motion of a water wave to rotational energy, said transducer comprising:
   a float having an opening therethrough extending from a lower to an upper end of said float;
   a rack bar extending through said float opening, said rack bar having rack teeth;
   means for securing one end of said rack bar to a fixed pivot axis for pivotal movement with respect to a water body in which said float is positioned;
   a swing block on said float through which said rack bar extends;
   a power gear in said swing block meshing with said rack teeth;
   a power shaft extending from said power gear;
   a drive gear on said power shaft;
   a transmission on said float;
   a transmission input gear coupled to said drive gear;
   a transmission output shaft; and
   clutch means between said drive gear and said transmission output shaft, permitting transmission of rotational energy to said output shaft in only one direction.

2. A transducer as in claim 1 in which said swing block comprises two spaced gear shaft supporting plates; and said power shaft extends through said plates with a drive gear on each end thereof.

3. A transducer as in claim 2 in which said drive gear is a bevel gear and said transmission input gears are bevel gears mating with said drive gear.

4. A transducer as in claim 3 in which said clutch means are arranged in a gear train in said transmission between said transmission input gears and said transmission output shaft.

5. A transducer as in claim 2 in which idler guide gears are supported between said plates above and below said power gear and on opposite sides of said rack bar.

6. A transducer as in claim 1 in which said float is in the shape of an elongate boat.

7. A transducer as in claim 6 in which the rack bar receiving opening in said float is offset with respect to the longitudinal center of the float.

8. A transducer as in claim 7 in which said float is flexibly anchored with respect to said rack bar.

9. A transducer as in claim 8 in which said rack bar is secured to a ball joint anchored in the bed of the body of water in which the transducer is positioned.

10. A transducer as in claim 1 in which a shield is formed in the opening through said float.

11. A transducer as in claim 8 in which said float is flexibly anchored by means of spaced masts; a cross-rod extending between said masts; a spring piston coupled to said rod; a tube surrounding said spring piston; and a compression spring in said tube retained between a tube end and a piston end to bias said piston and rod to a linear orientation.

12. A transducer as in claim 8 in which said float is flexibly anchored by means of two spaced masts; a slide collar on said mast; a cable between said float and said slide collar; and a slide roller on said slide collar riding on said mast.

13. A transducer as in claim 10 in which said shield is upwardly arcuate extending from the float opening to said rack bar; and rollers are formed on the shield adjacent said rack bar.

14. A transducer as in claim 7 in which weights are positioned on said float to provide desired stability.

* * * * *